United States Patent [19]

Kuribayashi

[11] Patent Number: 4,723,593

[45] Date of Patent: Feb. 9, 1988

[54] ROOM TEMPERATURE CONTROL UNIT RESPONSIVE TO OCCUPANCY

[75] Inventor: Yukio Kuribayashi, Soka, Japan

[73] Assignee: Aica Kogyo Co., Ltd., Nagoya, Japan

[21] Appl. No.: 826,919

[22] Filed: Feb. 7, 1986

[30] Foreign Application Priority Data

Jun. 7, 1985 [JP] Japan .................. 60-123907

[51] Int. Cl.$^4$ .................. G05D 23/00; H01H 3/16
[52] U.S. Cl. .................... 165/11.1; 165/27; 236/47; 236/51
[58] Field of Search ............ 165/11.1, 26, 27, 28; 236/47, 51

[56] References Cited

U.S. PATENT DOCUMENTS

| | | | |
|---|---|---|---|
| 2,355,040 | 8/1944 | Alexander et al. | 165/28 |
| 2,589,349 | 3/1952 | Diefenbach | 206/19.5 |
| 2,978,228 | 4/1961 | Carlson | 165/27 |
| 3,007,568 | 11/1961 | Kurland | 206/19.5 |
| 3,425,485 | 2/1969 | Newton | 165/27 |
| 3,465,131 | 9/1969 | Ten Eyck | 235/11.11 |
| 3,786,859 | 1/1974 | Day | 165/27 X |
| 3,906,447 | 9/1975 | Crafton | 340/149 A |
| 4,060,123 | 11/1977 | Hoffman et al. | 165/11.1 |
| 4,081,022 | 3/1978 | Wester | 165/11.1 |
| 4,091,866 | 5/1978 | Curatolo | 165/138 |
| 4,101,886 | 7/1978 | Grimes et al. | 165/14 |
| 4,150,350 | 4/1979 | Fong | 335/205 |
| 4,174,064 | 11/1979 | Pratt, Jr. | 236/1 B |
| 4,205,328 | 5/1980 | Gotanda | 340/521 |
| 4,213,110 | 7/1980 | Holce | 335/207 |
| 4,252,270 | 2/1981 | Taylor et al. | 165/27 X |
| 4,270,597 | 6/1981 | Denny | 165/27 |
| 4,293,026 | 10/1981 | Day | 165/11.1 |
| 4,485,864 | 12/1984 | Carrell et al. | 165/11.1 |
| 4,502,290 | 3/1985 | Suzuki et al. | 236/47 |
| 4,505,426 | 3/1985 | Rossi et al. | 236/47 |
| 4,569,476 | 2/1986 | Watabe | 236/47 |
| 4,585,162 | 4/1986 | Evans | 165/11.1 |

FOREIGN PATENT DOCUMENTS 925841 5/1963 United Kingdom .
2082352A 3/1982 United Kingdom .
2103843A 2/1983 United Kingdom .

Primary Examiner—William R. Cline
Assistant Examiner—John K. Ford
Attorney, Agent, or Firm—Finnegan, Henderson, Farabow, Garrett & Dunner

[57] ABSTRACT

The room temperature control unit is provided with a switch for determining whether the room is vacant or occupied and if required with a switch for determining whether the room is cooled or heated, so that the room temperature is controlled while the room is vacant to be somewhat (e.g. 2° C.) higher than a set temperature when the room is cooled, and somewhat (e.g. 2° C.) lower than a set temperature when the room is heated. For that purpose, at least two common contacts are provided and they are connected to switch contacts in different ways so that one common contact is selected according to whether the room is vacant or occupied.

3 Claims, 5 Drawing Figures

ROOM TEMPERATURE CONTROL UNIT RESPONSIVE TO OCCUPANCY

FIELD OF THE INVENTION

The present invention relates to a room temperature control unit, particularly to a unit for controlling a temperature in a vacant room.

BACKGROUND OF THE INVENTION

In a conventional air conditioner used in hotels or the like, a room temperature setting means having a dial with a temperature scale is provided in each room so that the room can be kept at a temperature desired by a guest. For example, if a guest sets the dial at 24° C., the temperature in the room is maintained at 24° C. For that purpose, the conventional air conditioner is generally provided with a plurality of switch contacts which are corresponding respectively to a plurality of temperature values predetermined at equal intervals, and each of which is applied with a voltage when the room temperature reaches its corresponding value, and also provided with means for maintaining the room temperature at a desired value by connecting a common contact to the switch contact corresponding to the set temperature value upon setting of that value.

However, if a guest leaves his room with the room temperature set at 24° C., for example, such a conventional unit will continue to keep the temperature in the vacant room at 24° C., causing waste of energy.

SUMMARY OF THE INVENTION

It is an object of the present invention to provide a room temperature control unit which can reduce waste of energy while the room is vacant by controlling the temperature to be higher than a set value by a certain level during air cooling, and by controlling it lower than a set value by a certain level during air heating.

Accordingly, the present invention has a purpose of saving energy by controlling a room temperature somewhat higher than a set value when the room is cooled and somewhat lower than a set value when heated.

According to the present invention, a room temperature control unit is provided with a switch for determining whether the room is vacant or not and, if required, a switch for determining whether the room is cooled or heated so as to control the room temperature somewhat higher (e.g. 2° C.) than a set value during cooling, and somewhat lower than a set value during heating while the room is vacant. For that purpose, the unit is provided with at least two common contacts which are connected differently to switch contacts such that one of the common contacts is selected according to whether the room is occupied or vacant. While the room is vacant, the room temperature is controlled to be somewhat higher than a set temperature when the room is cooled and somewhat lower than a set temperature when the room is heated. Accordingly, energy is saved without losing effects of cooling or heating.

DETAILED DESCRIPTION OF PREFERRED EMBODIMENT

The present invention is now described in detail with reference to a preferred embodiment thereof.

Figure 1:
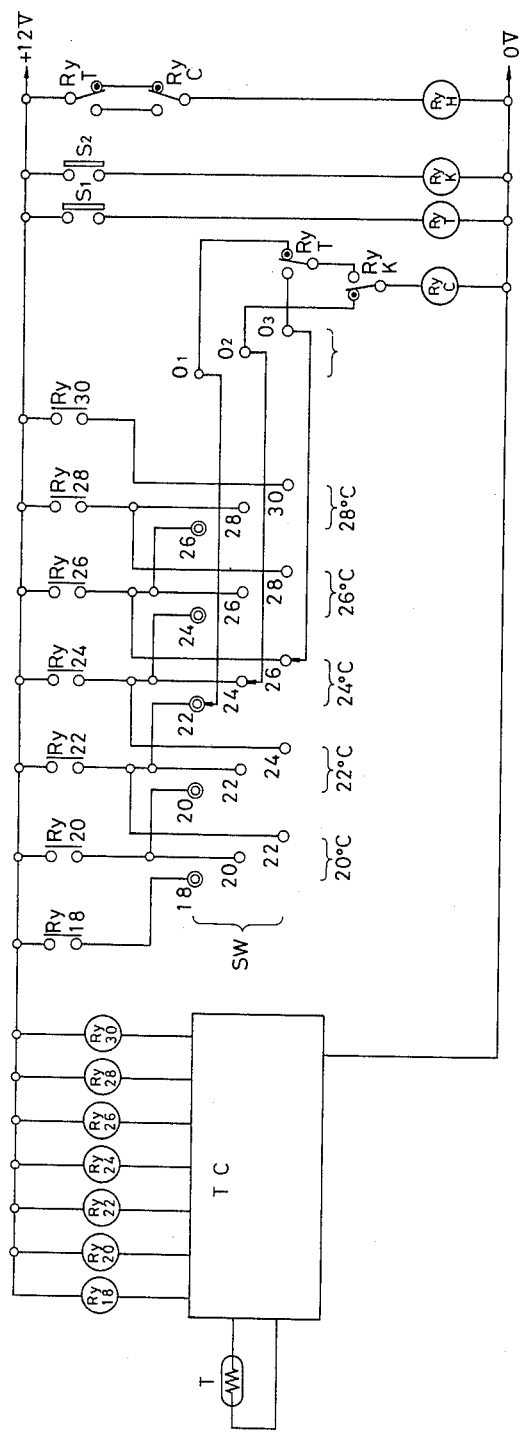
FIG. 1 is a circuit diagram illustrating an embodiment of the present invention.
Figure 2:
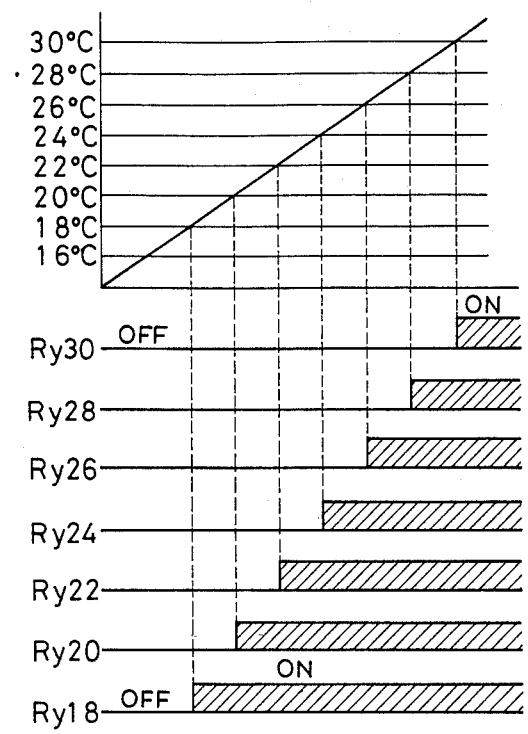
FIG. 2 illustrates operation of the temperature sensitive relays of FIG. 1.

FIG. 1 is a circuit diagram showing an embodiment of the present invention, in which the reference character T indicates a thermistor changing its resistance according to a room temperature; TC indicates a thermo-controller as shown in prior art; and Ry18 to Ry30 indicate relays actuated when the room temperature reaches 18° C., 20° C., ... and 30° C., respectively. FIG. 2 illustrates operation of the temperature-sensitive relays. As shown in the drawing, the relays Ry18, Ry20, Ry22 and Ry24 are turned ON when the temperature is at 24° C. The foregoing parts constitute a temperature sensing part. Switches designated by the same reference characters Ry18 to Ry30 are operational contacts, each of which is closed when the relay designated by the same character is turned ON.

Figure 3:
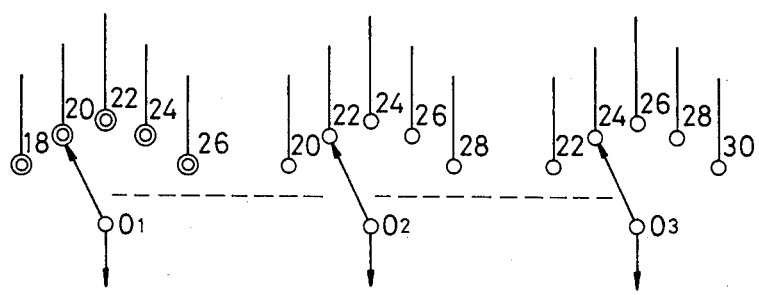
FIG. 3 illustrates the selector switches of FIG. 1.

A means for setting room temperature is constituted by a selector switch which is conventionally constructed as a rotary switch as shown in FIG. 3. The reference characters 20 and 28 indicate switch contacts corresponding respectively to the scale marks of 20° C. to 28° C. on a dial not shown in the drawing. In such a rotary switch, when the dial is set at 22° C., for example, the switch contact 22 is connected to the common contact 0 as shown in the drawing. According to prior art, each of the switch contacts 20 to 28 is connected to one end of the corresponding relay contact Ry20 to Ry28. For example, the switch contact 24 is connected to the relay contact Ry24 only. In the present embodiment, however, a selector switch is provided by a five-circuit three-step rotary switch in which five circuits (connections) are changed over in three steps as a dial is turned from 20° C. to 28° C. Returning to FIG. 1, the reference character SW indicates such a rotary switch $0_1$, $0_2$ and $0_3$ indicate three common contacts (which are provided, for example, on a rotary shaft in three stages), and the characters 18 to 30 indicate switch contacts connected to these common contacts. Each of the switch contacts 18 and 30 is connected to one end of the corresponding relay contact of Ry18 to Ry30. It should be noted that the group of these switch contacts consists of one switch contact 18 to 30, each two switch contacts 20 and 28, and each three switch contacts 22, 24 and 26. The selector switch SW is more clearly illustrated in FIG. 3.

When the dial is turned to 20° C., the common contact $0_1$ is connected to the switch contact 18, the common contact $O_2$ to the switch contact 20 and the common contact $O_3$ to the switch contact 22. When the dial is turned to 22° C., the common contacts $O_1$, $O_2$ and $O_3$ are connected to the switch contacts 20. 22 and 24, respectively. In such a manner, connections are changed over upon every reset of the dial. FIG. 1 shows the connection when the dial is set at 24° C. As seen from the drawing, one end of the relay contact Ry20 is connected to the two contact switches 20, one end of the relay contacts Ry 22 to Ry26 are connected respectively to the switch contacts 22, 24 and 26 provided each in three, and one end of the relay contact Ry28 is connected to the two switch contacts 28. One end of the relay contacts Ry18 and Ry30 are connected respectively to the switch contacts 18 and 30 which are provided singly. If it is desired to control temperature in the range from 18° C. to 30° C., a seven-circuit three-step rotary switch should be employed.

The reference character $S_1$ indicates a thermostatic switch for sensing a temperature of cold/hot water as described hereinafter. The thermostatic switch $S_1$ is turned ON when the temperature of the water is at 35° C. or less and OFF when it is over 35° C. The reference character RyT is a relay which is turned ON and OFF according to ON/OFF operation of the thermostatic switch $S_1$. Two switches designated by the same character are operational contacts of the relay RyT. These contacts RyT are switched to the cooling side when the temperature of the cold/hot water is 35° C. or less, and switched to the heating side when the temperature is over 35° C. The reference character $S_2$ is a key sensor switch which reacts to a key holder inserted into a key sensor by a guest such that the key sensor switch $S_2$ is turned ON when the room is vacant and OFF when the room is occupied. RyK indicates a relay which is turned ON and OFF according to the ON/OFF operation of the key sensor Switch $S_2$, and a switch designated by the same character is an operational contact of the relay RyK. This contact RyK is connected to the room-vacant side when the room is vacant and to the room-occupied side when the room is occupied. A relay RyC as seen from the drawing, is turned ON, while being connected to the second common contact $O_2$ when the room is occupied, to the first common contact $O_1$ when the room is vacant and heated, and to the third common contact $O_3$ when the room is vacant and cooled. The relay RyC thus switches over an operational contact designated by the same character according to whether the room is vacant or occupied. A relay RyH is a temperature regulating relay as described hereinafter which is turned ON when the room is occupied and heated or when the room vacant and cooled, and turned OFF when the room is vacant and heated or when it is occupied and cooled.

The operation of the present embodiment is now described.

Supposing that the dial is set by a guest at 24° C. while the room is heated, the common contacts $O_1$, $O_2$ and $O_3$ are connected to the switch contacts 22, 24 and 26 respectively. Since the room is heated, the temperature of the cold/hot water is over 35° C. So the thermostatic switch $S_1$ is OFF, the relay RyT is OFF and the two contacts RyT are positioned as shown in FIG. 1. Since the room is occupied, the key sensor switch $S_2$ is OFF, the relay RyK is OFF and the contact RyK is positioned as shown in the drawing. The relay RyC is connected to the switch contacts 24 through the common contact $O_2$. Since the relay RyC is not turned ON until the room temperature reaches 24° C., the contact RyC is positioned as shown in FIG. 1. The relay RyH is thereby turned ON to raise the room temperature as described hereinafter. When the room temperature reaches 24° C., the relay RyC is turned ON, switching the contact RyC to the opposite side whereby the relay RyH is turned OFF, stopping the raise of the room temperature. Thus, the room temperature is maintained at 24° C. while the room is occupied.

When the guest gets out of the room, taking off the key holder from the key sensor, the key sensor $S_2$ is turned ON. So the relay RyK is turned ON and the contact RyK is switched to the room vacant side, opposite from the position as shown in the drawing. The relay RyC is thereby connected to the contact switches 22 through the common contact $O_1$. Since the relay contact Ry22 is ON on this occasion, the relay RyC continues to be ON and the relay RyH to be OFF. Accordingly the raise of the room temperature is still kept stopped. When the temperature becomes lower than 22° C., however, the relay contact Ry22 is turned OFF, the switch contact 22 is turned OFF(no voltage is applied) and the relay RyC is turned OFF. The contact RyC is thereby returned to the position as shown in the drawing, namely to the heating side, turning the relay RyH ON. Thus the room temperature is raised. When the temperature reaches 22° C., the raise of the temperature is stopped in the same way as described previously, so that the the temperature of the vacant room is maintained at 22° C. Namely, while the room is vacant, the temperature is controlled at 22° C., the value lower than the set value of 24° C. by two degrees.

In the foregoing, the embodiment has been described for the heating mode. In the cooling mode, the operational contact RyT of the relay RyT is switched over to the cooling-mode side, whereby the relay contact Ry26 is connected to the relay RyC through the switch contact 26 and the common contact $O_3$. Accordingly, the temperature is maintained at 26° C., the value higher than the set value by two degrees, in a similar way to that described previoususly.

Figure 4:
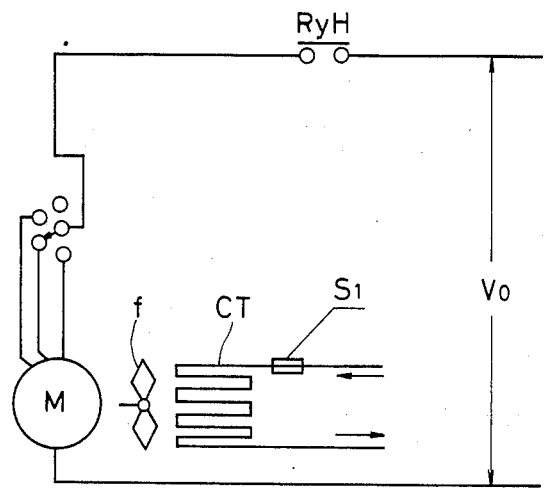
FIGS. 4A and 4B are schematic views illustrating examples of temperature regulating apparatus usable in the unit according to the present invention.
Figure 4:
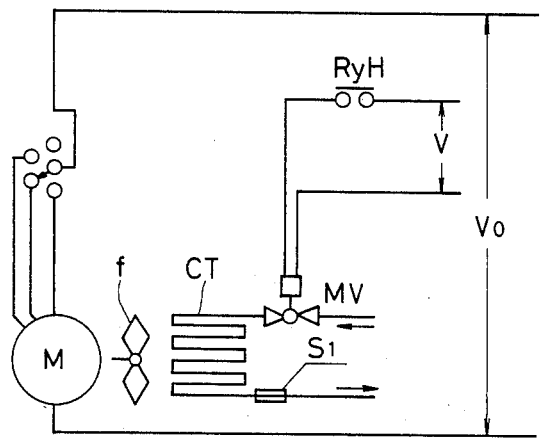

FIGS. 4A and 4B are schematic views illustrating examples of an apparatus for raising and/or lowering the room temperature. FIG. 4A shows an example in which a fan motor is controlled and FIG. 4B shows another example in which a motor operated valve is controlled. In these drawings, the reference character RyH indicates an operational contact of the relay RyH of FIG. 1, $S_1$ indicates the thermostatic switch of FIG. 1, M indicates a fan motor, f indicates a fan, CT indicates a coil tube and Vo indicates a supply voltage. The coil tube CT is supplied with cold/hot water. This cold/hot water becomes cold water having a temperature of 35° C. or less during air cooling and becomes hot water having a temperature over 35° C. during air heating.

In FIG. 4A. the relay RyH is turned ON and OFF to close and open the contact RyH so that power supply to the fan motor M is turned ON and OFF. Rotation of the fan motor M causes the room temperature to decrease during air cooling and to rise during air heating. In FIG. 4B, a small motor operated valve MV is fixed at the inlet of the coil tube CT such that it is controlled to be opened or closed by turning the relay contact RyH ON or OFF. The reference character V indicates a controlling voltage.

In the embodiment as described above, the temperature is controlled, while the room is vacant, to be higher than the set value by two degrees during air cooling and to be lower by two degrees during air heating. This value of two degrees, however, may be varied to any desired value. Further, while the embodiment as described above is adapted to change over the switches according to whether it operates in the cooling mode or the heating mode, the present invention can be applied to an air conditioner exclusively for cooling or for heating providing similar effects.

What is claimed is:

1. A room temperature control system for automatically adjusting the room temperature control setpoint in accordance with the occupied or unoccupied room status and with the heating or cooling mode status of a room heating/cooling apparatus, comprising:
- a plurality of first switches each corresponding to a respective predetermined temperature value, respective first switches being activated when the room temperature reaches said respective predetermined temperature value;
- a temperature selection device for selecting a desired room temperature value, said selection device having first, second and third common contacts, each said contact being selectively operably connected to respective ones of said first switches, said second common contact corresponding to said desired room temperature and said first and third contacts corresponding respectively to predetermined lower and upper temperature limit setpoints defining a range of room temperatures for said control system to operate within;
- a thermostatic switch alternately activated and deactivated in accordance with the operating mode of said heating/cooling apparatus; and
- a keysensor switch alternately activated and deactivated in accordance with the occupancy status of the room, said temperature control system operable to selectively adjust said desired room temperature value in accordance with the room occupancy status as indicated by said keysensor switch, and said temperature control system being further operable to selectively adjust said desired room temperature value to one of said predetermined upper and lower temperature limit setpoints in accordance with the operating mode of said heating/cooling apparatus as indicated by said thermostatic switch.

2. The temperature control system of claim 1, further comprising a thermo-controller which adjusts the current room temperature to said desired room temperature according to output signals from said first switches, said thermostatic switch and said keysensor switch.

3. The temperature control system of claim 1, wherein said thermostatic switch is alternately activated and deactivated in accordance with a predetermined temperature of a working fluid in said heating/cooling apparatus.

* * * * *